US006950083B1

(12) United States Patent  (10) Patent No.: US 6,950,083 B1
Lee  (45) Date of Patent: Sep. 27, 2005

(54) ELECTRONIC PROJECTOR CAPABLE OF SAVING AND DISPLAYING A USER-DEFINED LOGO

(75) Inventor: Tian-quey Lee, Hsin Chu (TW)

(73) Assignee: Mustek Systems Inc., Hsin-Chu (TW)

( * ) Notice: Subject to any disclaimer, the term of this patent is extended or adjusted under 35 U.S.C. 154(b) by 758 days.

(21) Appl. No.: 09/629,660

(22) Filed: Aug. 1, 2000

Related U.S. Application Data

(63) Continuation-in-part of application No. 08/933,201, filed on Dec. 18, 1997, now Pat. No. 5,941,538.

(51) Int. Cl.⁷ ............................................. G09G 3/36
(52) U.S. Cl. ......................... 345/87; 345/530; 345/536
(58) Field of Search .................. 345/87, 521, 502–520, 345/422, 157, 173, 530, 537, 204, 536; 348/751, 348/761, 766

(56) References Cited

U.S. PATENT DOCUMENTS

| | | | | |
|---|---|---|---|---|
| 5,214,419 A | * | 5/1993 | DeMond et al. ............ 340/794 |
| 5,337,403 A | * | 8/1994 | Klingman .................... 359/140 |
| 5,502,576 A | * | 3/1996 | Ramsay et al. ............. 358/444 |
| 5,534,942 A | * | 7/1996 | Beyers, Jr. et al. ......... 348/569 |
| 5,600,766 A | * | 2/1997 | Deckys et al. .............. 359/135 |
| 5,689,800 A | * | 11/1997 | Downs ........................ 455/5.1 |
| 5,859,623 A | * | 1/1999 | Meyn et al. .................... 345/1 |
| 5,917,496 A | * | 6/1999 | Fujita et al. ................ 345/422 |
| 6,269,441 B1 | * | 7/2001 | Lee et al. ...................... 713/1 |
| 6,282,149 B1 | * | 8/2001 | Pittau .......................... 365/233 |
| 6,335,764 B1 | * | 1/2002 | Hashimoto et al. ......... 348/565 |
| 6,373,494 B1 | * | 4/2002 | Horioka et al. ............. 345/581 |
| 6,573,945 B1 | * | 6/2003 | Wu et al. ..................... 348/584 |

* cited by examiner

Primary Examiner—Regina Liang
Assistant Examiner—Jennifer T. Nguyen
(74) Attorney, Agent, or Firm—Lowe Hauptman & Berner LLP.

(57) ABSTRACT

An electronic projector capable of saving and displaying a user-defined logo is provided. The electronic projector receives video signals from an image source device, such as a computer, a DVD, or a television for projecting the video signals onto a screen. The video signals from the image source device are converted to digital signals and then temporarily saved in a display buffer to speed up the display rate. The user-defined logo can be designed by a graphics application program or by freezing a static image from the video signals. After converting to digital signals, the user-defined logo is then saved in a non-volatile memory. A data access controller controls the display and update of the user-defined logo. When the user-defined logo is to be updated, the new user-defined logo is saved in the non-volatile memory to overwrite the previous logo. On the other hand, when the user-defined logo is to be displayed, the user-defined logo is copied from the non-volatile memory and then saved in the frame buffer to speed up the display rate. Eventually, with the logo update mechanism, the electronic projector can easily update and display a user-defined logo.

15 Claims, 6 Drawing Sheets

ELECTRONIC PROJECTOR CAPABLE OF SAVING AND DISPLAYING A USER-DEFINED LOGO

CONTINUATION-IN PART APPLICATION DATA

The present application is a continuation-in-part of a co-pending Continued Prosecution Application based on parent U.S. application Ser. No. 08/933,201, filed on Dec. 18, 1997, now U.S. Pat. No. 5,941,538 invented by Lee et al.

BACKGROUND OF THE INVENTION

A. Field of the Invention

The present invention relates to an electronic projector, especially to a Liquid Crystal Display (LCD) projector capable of saving and displaying user-defined logos.

B. Description of the Related Art

There are various types of LCD projectors available on the market. Refer to FIG. 1 for showing the structure of the conventional LCD projectors. It includes a projector body 11, a main focusing lens 12, an optical projection system 13, a LCD display panel 14, and a lamp assembly 15. Generally, these LCD projectors can only display whatever video signals transmitted from an image source device 16, such as a computer, a television, or a DVD, etc. In addition to continuously projecting the video signals from the image source device, the conventional LCD projectors can also display a static image in response to the control of an on-screen-display (OSD) circuit. Usually, such a static image is a company logo or background color that has been previously saved in the LCD projector at the assembly line.

Refer to FIG. 2 for showing the general structure of the OSD circuit 20. The image data of the company logo or background color is initially stored in a memory device 3 of an OSD circuit 20. When the LCD projector is powered-on or stand-by, the image data is automatically projected on the screen via the LCD panel display 14 under the control of the controller 2. However, since the conventional LCD projector does not provide an updated mechanism for the user to update the image data of the logo, so the users cannot access the image of the logo originally specified in the memory device 3. It is therefore desirable to provide a LCD projector which can allow users to update and display the user-defined logo stored in the memory device 3 of the conventional LCD projector.

SUMMARY OF THE INVENTION

Accordingly, it is an object of the present invention to provide an electronic projector which allows users to save and update images data of a logo in the electronic projector in response to the control of the Central Process Unit.

Accordingly, an aspect of the invention provides an electronic projector capable of saving and displaying a user-defined logo. The electronic projector receives video signals from an image source device, such as a computer, a DVD, or a television for projecting the video signals onto a screen. The video signals from the image source device are converted to digital signals and then temporarily saved in a display buffer to speed up the display rate. The user-defined logo can be designed by a graphics application program or by freezing a static image from the video signals. After converting to digital signals, the user-defined logo is then saved in a non-volatile memory. A data access controller controls the display and update of the user-defined logo. When the user-defined logo is to be updated, the new user-defined logo is saved in the non-volatile memory to overwrite the previous logo. On the other hand, when the user-defined logo is to be displayed, the user-defined logo is copied from the non-volatile memory and then saved in the frame buffer to speed up the display rate. Eventually, with the logo update mechanism, the electronic projector can easily update and display a user-defined logo.

BRIEF DESCRIPTION OF THE DRAWINGS

These and other objects and advantages of the present invention will become apparent by reference to the following description and accompanying drawings wherein.

DETAIL DESCRIPTION OF THE INVENTION

Figure 1:
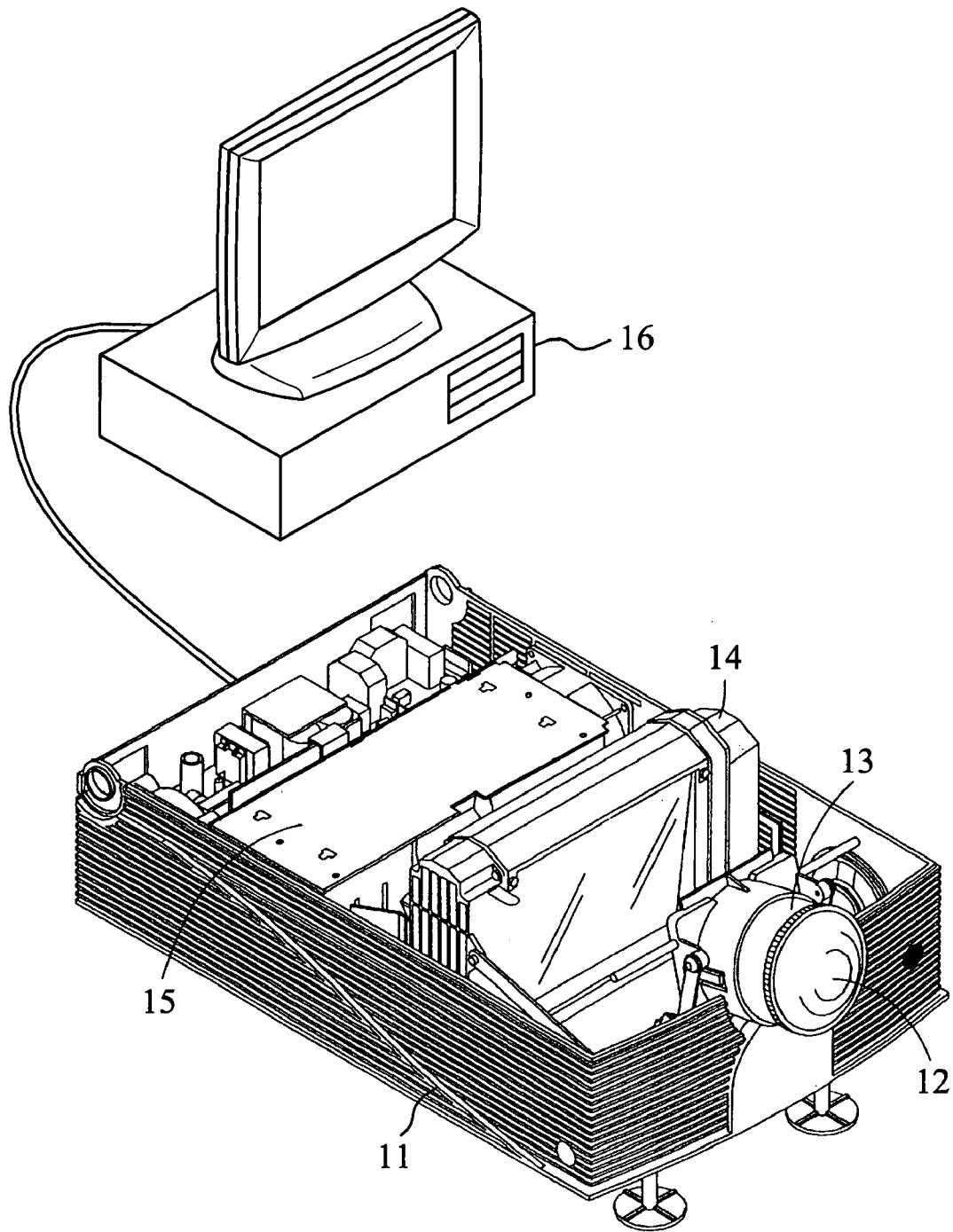
FIG. 1 is a diagram showing the structure of a conventional LCD projector.
Figure 2:
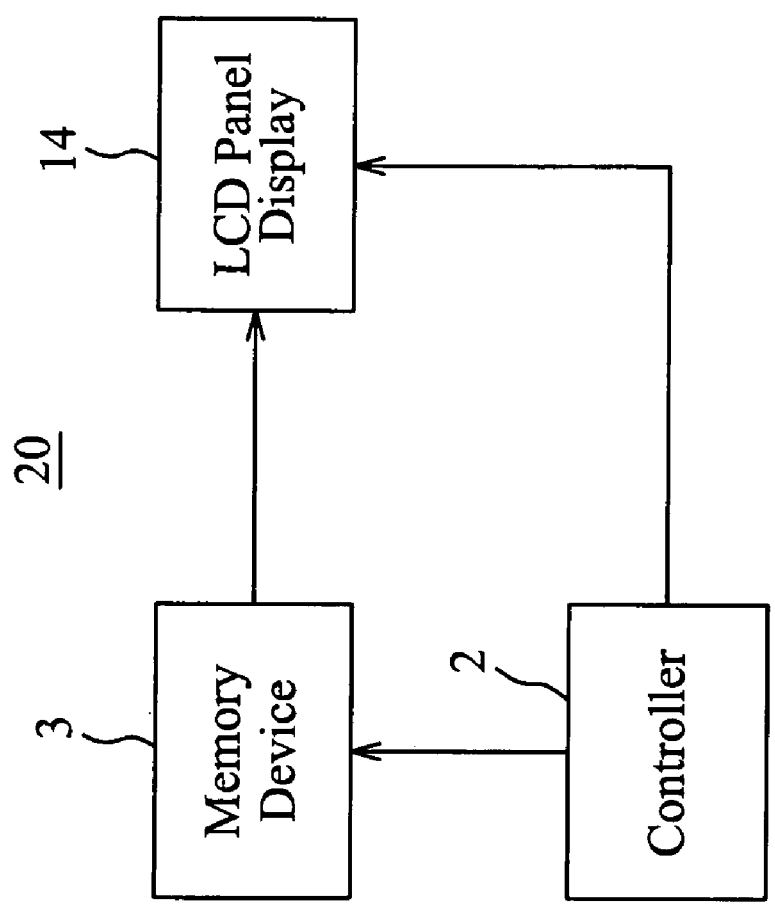
FIG. 2 is a schematic block diagram showing the structure of an OSD of a LCD projector.
Figure 3:
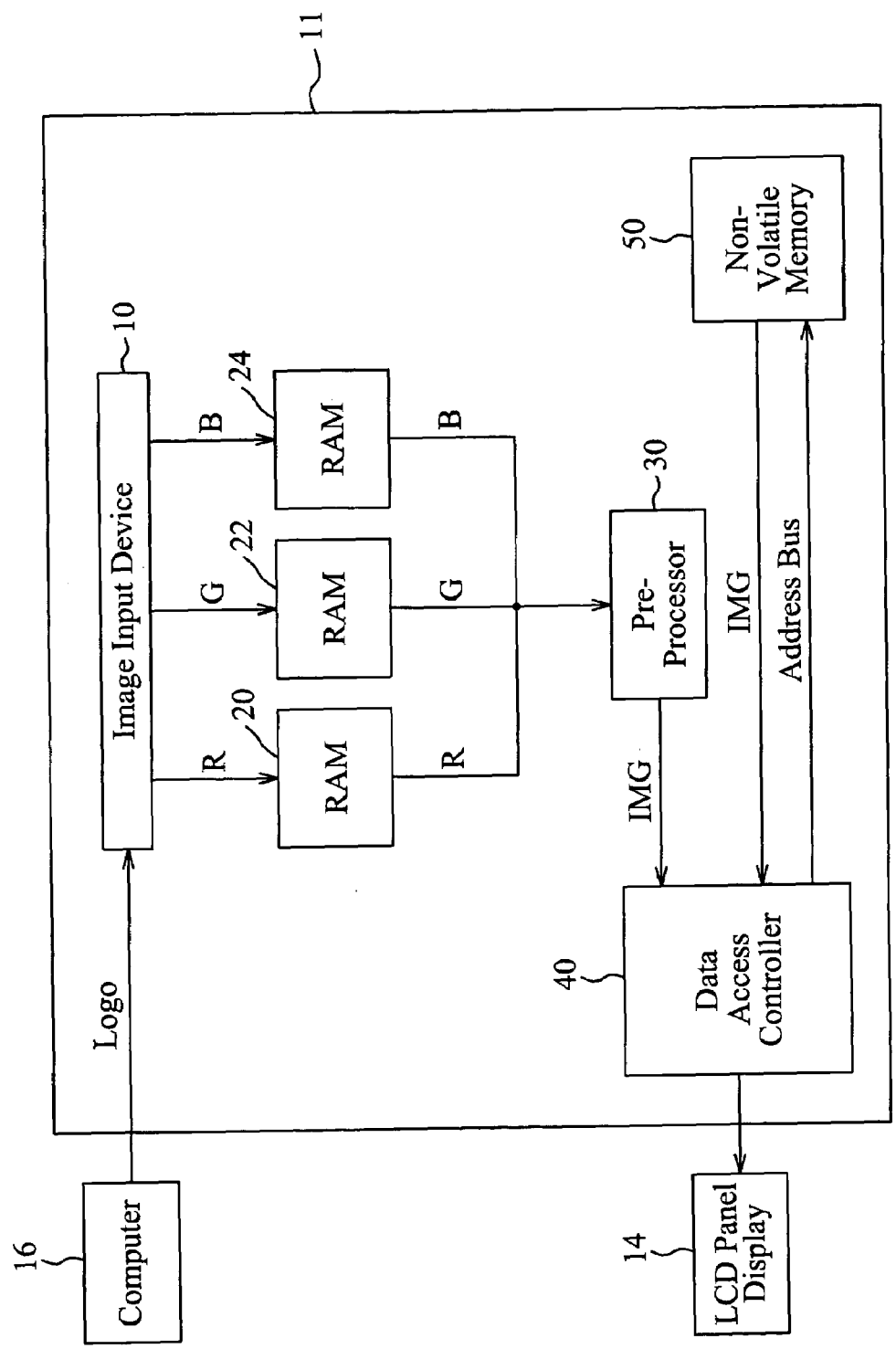
FIG. 3 is a schematic block diagram showing the LCD projector according to the preferred embodiment of the present invention.

The logo update and display system for the electronic projector according to the preferred embodiment of the invention is shown in FIG. 3. The projector body 11 is connected to a computer 16 which can run a graphics application program for designing a logo or a graphics. The computer 16 can also transmit video signals to the projector body 11 for projecting a series of video images on to the screen. The video images or the user-defined logo are transmitted to the projector body 11 via the image input device 10. Since the video images and the user-defined logo are analog signals, so they must be converted into digital signals to be saved.

After converting to digital signals, the RGB color components of the video images and the user-defined logo are then analyzed and saved in associated Random Access Memory (RAM) 20, 22, and 24 respectively. The RGB color components of the image data are then processed by the pre-processor 30 for scaling up/down the images, or converting the scan rate according to the display configuration of the image source device 16 and the LCD panel display 14. After being processed by the pre-processor 30, the image data of the logo IMG is saved in the non-volatile memory 50 via the address bus in response to the control of the data access controller 40.

The pre-processor 30 can be removed from the invention if the capacity of the non-volatile memory 50 is large enough and the operating rate is high enough. In that case, the RGB color components of the image data can be directly saved in the non-volatile memory 50.

Figure 4:
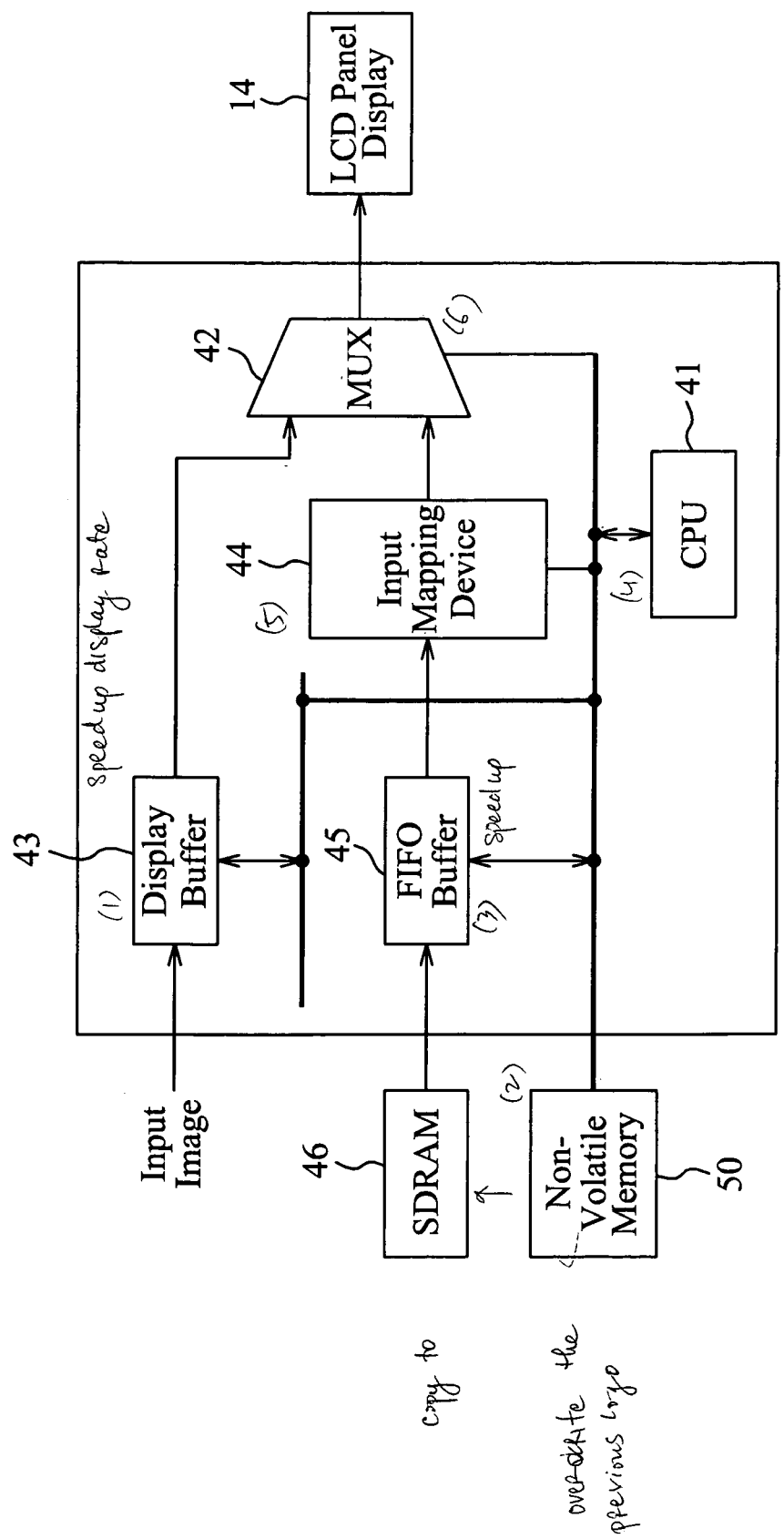
FIG. 4 is a schematic block diagram showing the structure of a Data Access Controller according to the preferred embodiment of FIG. 3.

Refer to FIG. 4 for showing the detailed structure of the data access controller 40. The data access controller 40 controls the sources of the images to be projected on the screen. For example, display buffer 43 temporarily saves the video images output of the pre-processor 30. Usually, these video images are continuously transmitted from the image source device, such as a computer 16. When the video images are continuously transmitted from the image source device, they are buffered in the display buffer 43 in a FIFO order to speed up the display rate.

When a user-defined logo is determined, the user-defined logo is transmitted from the Display Buffer 43 and then saved in the non-volatile memory 50, such as a flash Read-Only-Memory (ROM). The saving operation will overwrite the previous logo image data. For display, the logo image data in the non-volatile memory 50 must be copied to the SDRAM 46 before it is sent to the LCD panel display 14 to be displayed. Then, the user-defined logo is sent to the FIFO Buffer 45 to speed up the display rate. If the Input Mapping Device 44 is added to save the cost of the non-volatile memory 50, the Input Mapping Device 44 will be implemented to add zeros to the remaining bits of the RGB bitstreams of the user-defined logo before sending to the MUX 42.

The input mapping device 44 is implemented for the concern of the cost or the size of the non-volatile memory 50. For example, if each of the color components R, G, B has 24 bits, the pre-processor 30 can selects 3 most significant bits (MSBs) with following zeros from the RGB bitstreams respectively to form 3 8-bit compressed bitstreams. As a result, the memory size of the non-volatile memory 50 required can be reduced because the resolutions of the logo have been compressed.

The MUX 42 can select the image input from the Display buffer 43 or the Input Mapping Device 44 in response to the control of the Central Process Unit (CPU) 41. According to a preferred embodiment of the invention, the CPU 41 can select from several display configurations, such as a user-defined logo configuration, a background color configuration, or a pre-determined logo configuration. If the LCD projector is at an initial power-on state or a stand-by state, the CPU 41 sends a selection signal to the MUX 42 to select the image output of the image mapping device 44 if the image mapping operations must be performed. If the LCD projector is during the time of displaying video images from the computer 16, the CPU 41 sends the selection signal to the MUX 42 to enable the image data output directly from the display buffer.

Figure 5:
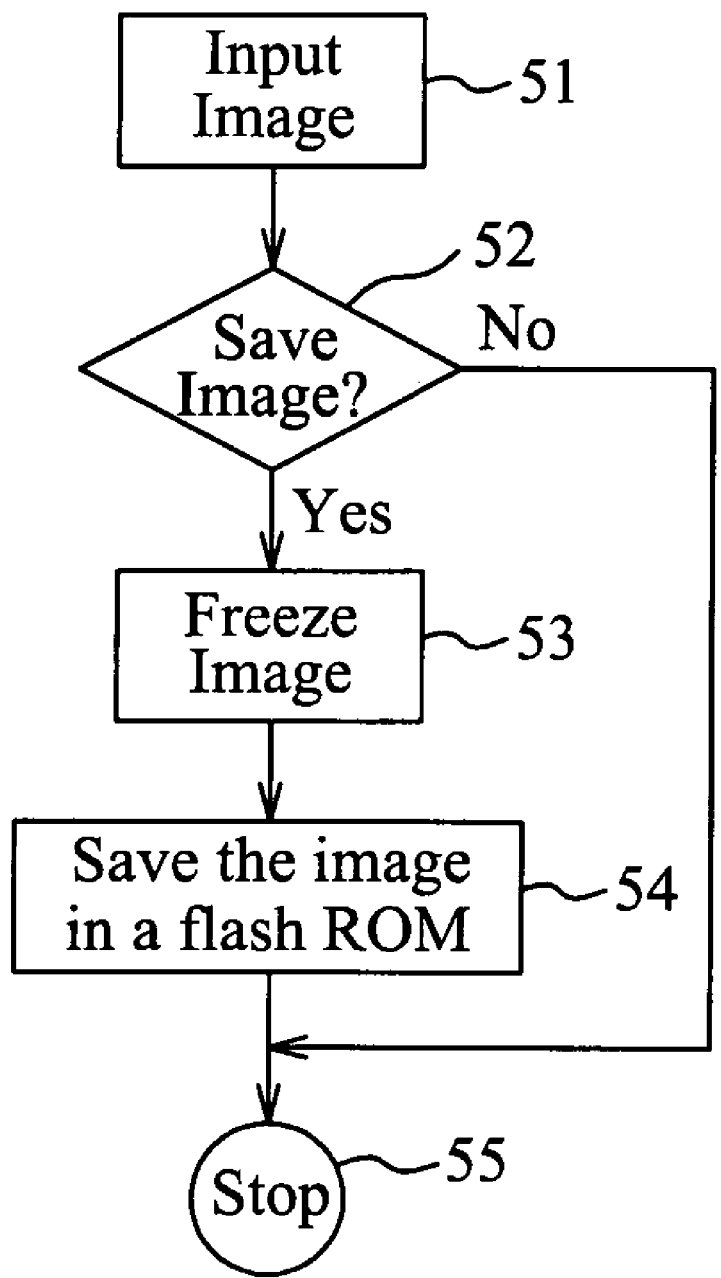
FIG. 5 is a flowchart showing the logo saving procedure according to the preferred embodiment of the present invention.

Refer to FIG. 5 for showing the operations for saving logos. Step 51: image data of the logo is input from a computer. Step 52: determine if the image is to be saved as a logo? If yes, go to step 53. If not, go to step 55. Since the logo is a static image, so freeze the image on display, step 53. Then, save the static image data of the logo in a flash ROM, step 54. And then stop, step 55.

Figure 6:
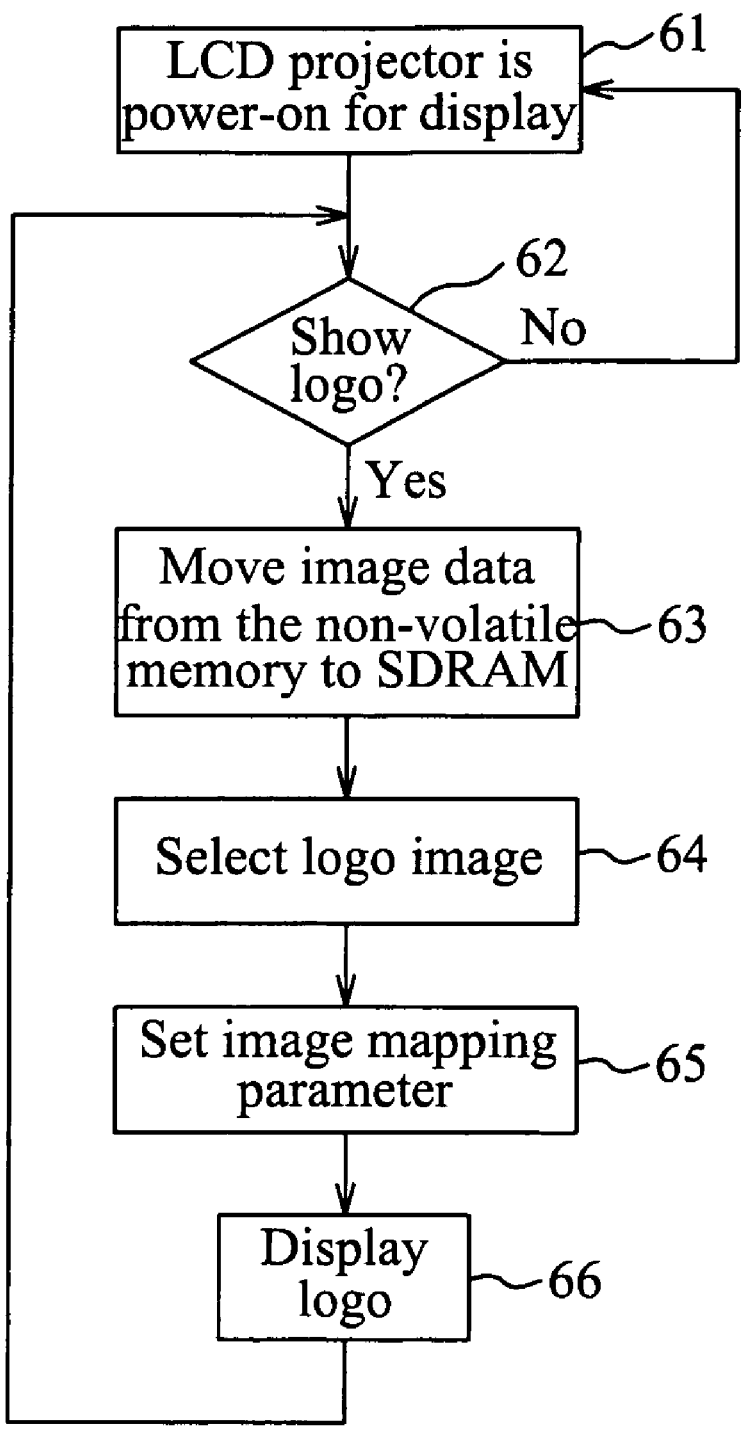
FIG. 6 is a flowchart showing the logo displaying procedure according to the preferred embodiment of the present invention.

Refer to FIG. 6 for showing the operations of logo display. When the LCD projector is on display, step 61, check if the logo is to be displayed, step 62. If yes, move the image data in the flash ROM to the SDRAM, step 63. If not, go to step 66 to stop displaying the logo. The logo image can be sent to the LCD panel display 14 via the MUX, step 64. Then, set the image mapping parameter for displaying the logo according to the configuration of the CPU, step 65. Then, go to step 66 to display logo. And then back to step 62 to continue the process.

To sum up, the invention provides an electronic projector which provides a mechanism for saving and displaying a user-defined logo with the assistance of a graphics application program. Eventually, the user can update a preferred logo of their company after purchasing the electronic projector and display it at a proper pre-determined time period.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. An electronic projector adaptable to an image source device for projecting video images from said image source device on a screen via a LCD panel display, comprising:
    means for receiving video signals from said image source device;
    buffer means coupled to said receiving means for temporarily saving said video signals;
    a non-volatile memory coupled to said buffer means for saving a selected static image of said video signals as a user-defined logo;
    a frame buffer connected to said non-volatile memory for speeding up the display of said user-defined logo;
    a Central Process Unit for determining a display configuration; and
    means for selecting said video signals output of said buffer means or said user-defined logo of said frame buffer in response to a determined display configuration of said Central Process Unit.

2. The electronic projector as claimed in claim 1, further comprising:
    image mapping means connected to said frame buffer for performing color mapping operations.

3. The electronic projector as claimed in claim 1, wherein said display configuration is selectable from a user-defined logo configuration, a pre-determined logo configuration, and a background color configuration.

4. The electronic projector as claimed in claim 1, wherein said non-volatile memory is a flash Read-Only-Memory.

5. The electronic projector as claimed in claim 1, wherein said frame buffer is a Synchronous Dynamic Random Access Memory.

6. A method for saving and displaying a user-defined logo for an electronic projector, comprising the steps of:
    transmitting a user-defined logo image to said electronic projector;
    saving temporarily a video signals from a receiving means to a buffer means:
    saving said user-defined logo image in a non-volatile memory;
    copying said user-defined logo image from said non-volatile memory to a frame buffer;
    determining a display configuration by a Central Process Unit; and
    selecting said video signals output of said buffer means or said user-defined logo of said frame buffer in response to a determined display configuration of said Central Process Unit.

7. The method as claimed in claim 6, further comprising the step of:
    perform image mapping on said user-defined logo image according to a display configuration.

8. The method as claimed in claim 6, wherein said user-defined logo image is provided by using a graphics application program.

9. The method as claimed in claim 6, wherein said user-defined logo image is provided by selecting a static image from a series of video images of an image source device.

10. The method as claimed in claim 6, wherein said display configuration is selectable from a user-defined logo configuration, a pre-determined logo configuration, and a background color configuration.

11. An electronic projector system, comprising:
an electronic projector;
an image source device connected to said electronic projects for projecting video images from said image source device on a screen from said electronic projector;
means for receiving video signals from said image source device;
buffer means coupled to said receiving means for temporarily saving said video signals;
a non-volatile memory coupled to said buffer means for saving a selected static image of said video signals as a user-defined logo;
a frame buffer connected to said non-volatile memory for speeding up the display of said user-defined logo;
a Central Process Unit for determining a display configuration; and
means for selecting said video signals output of said buffer means or said user-defined logo of said frame buffer in response to a determined display configuration of said Central Process Unit.

12. The electronic projector as claimed in claim 11, further comprising:
image mapping means connected to said frame buffer for performing color mapping operations.

13. The electronic projector as claimed in claim 11, wherein said display configuration is selectable from a user-defined logo configuration, a predetermined logo configuration, and a background color configuration.

14. The electronic projector as claimed in claim 11, wherein said non-volatile memory is a flash Read-Only-Memory.

15. The electronic projector as claimed in claim 11, wherein said frame buffer is a Synchronous Dynamic Random Access Memory.

* * * * *